US012718036B2

(12) United States Patent
Iwasaki et al.

(10) Patent No.: US 12,718,036 B2
(45) Date of Patent: Aug. 25, 2026

(54) ARTICLE READING SYSTEM, ARTICLE READING DEVICE, AND ARTICLE READING METHOD

(71) Applicant: NEC Corporation, Tokyo (JP)

(72) Inventors: Ryo Iwasaki, Tokyo (JP); Takuo Daikaku, Tokyo (JP)

(73) Assignee: NEC CORPORATION, Tokyo (JP)

( * ) Notice: Subject to any disclaimer, the term of this patent is extended or adjusted under 35 U.S.C. 154(b) by 100 days.

(21) Appl. No.: 18/723,919

(22) PCT Filed: Mar. 29, 2022

(86) PCT No.: PCT/JP2022/015324
§ 371 (c)(1),
(2) Date: Jun. 25, 2024

(87) PCT Pub. No.: WO2023/187959
PCT Pub. Date: Oct. 5, 2023

(65) Prior Publication Data

US 2025/0061294 A1 Feb. 20, 2025

(51) Int. Cl.
*G06K 7/10* (2006.01)
*G06V 20/52* (2022.01)
*G06V 40/10* (2022.01)

(52) U.S. Cl.
CPC .......... *G06K 7/10118* (2013.01); *G06V 20/52* (2022.01); *G06V 40/103* (2022.01); *G06V 2201/07* (2022.01)

(58) Field of Classification Search
CPC .. G06K 7/10118; G06V 20/52; G06V 40/103; G06V 2201/07
USPC ........................................................ 340/572.4
See application file for complete search history.

(56) References Cited

U.S. PATENT DOCUMENTS

| | | | | |
|---|---|---|---|---|
| 8,130,104 B1 * | 3/2012 | Braiman | G07C 9/27 340/572.1 |
| 9,898,919 B2 * | 2/2018 | Thomas | H04L 12/282 |
| 10,157,303 B1 * | 12/2018 | Lavery | G06Q 20/3224 |
| 10,445,593 B1 * | 10/2019 | Mathiesen | G06V 20/53 |
| 2012/0146787 A1 * | 6/2012 | Bose | G08B 21/02 340/539.13 |
| 2014/0097247 A1 * | 4/2014 | Zumsteg | G06K 7/10099 235/440 |

(Continued)

FOREIGN PATENT DOCUMENTS

| | | |
|---|---|---|
| JP | 2008-027200 A | 2/2008 |
| JP | 2021-101379 A | 7/2021 |

(Continued)

OTHER PUBLICATIONS

JP Office Action for JP Application No. 2024-510768, mailed on Mar. 25, 2025 with English Translation.

(Continued)

*Primary Examiner* — Kerri L Mcnally
(74) *Attorney, Agent, or Firm* — Sughrue Mion, PLLC

(57) ABSTRACT

An article reading system according to an aspect of the present disclosure includes: at least one memory configured to store instructions: and at least one processor configured to execute the instructions to: identify a reading position from an image including a gate and a customer; and execute reading of article information from a wireless tag appended to an article, using an article reader provided to the gate.

8 Claims, 14 Drawing Sheets

(56) References Cited

U.S. PATENT DOCUMENTS

| | | | | |
|---|---|---|---|---|
| 2020/0019949 | A1* | 1/2020 | Simmons | G06Q 10/087 |
| 2020/0202177 | A1* | 6/2020 | Buibas | G06F 3/013 |
| 2020/0293806 | A1* | 9/2020 | Sato | G06V 20/10 |
| 2021/0264503 | A1* | 8/2021 | Hara | G06Q 20/202 |
| 2021/0304584 | A1* | 9/2021 | Singh | G01J 5/90 |
| 2021/0342966 | A1* | 11/2021 | Watanabe | G06Q 10/06315 |

FOREIGN PATENT DOCUMENTS

| | | | |
|---|---|---|---|
| JP | 7016191 | B1 | 2/2022 |
| WO | 2021/010163 | A1 | 1/2021 |
| WO | 2021/214986 | A1 | 10/2021 |
| WO | 2022/049658 | A1 | 3/2022 |

OTHER PUBLICATIONS

International Search Report for PCT Application No. PCT/JP2022/015324, mailed on May 10, 2022.

English translation of Written opinion for PCT Application No. PCT/JP2022/015324, mailed on May 10, 2022.

* cited by examiner

START
S20
ACQUIRE IMAGE INCLUDING GATE AND CUSTOMER WHO IS ABOUT TO PASS THROUGH GATE OR CUSTOMER WHO IS PASSING THROUGH GATE
S21
IDENTIFY READING POSITION
S22
READING POSITION IS EXPECTED TO PASS THROUGH OUTSIDE OF READING RANGE OR READING POSITION IS PASSING THROUGH OUTSIDE OF READING RANGE
NO
YES
S23
CHANGE READING RANGE
S24
EXECUTE READING
END

Fig.9

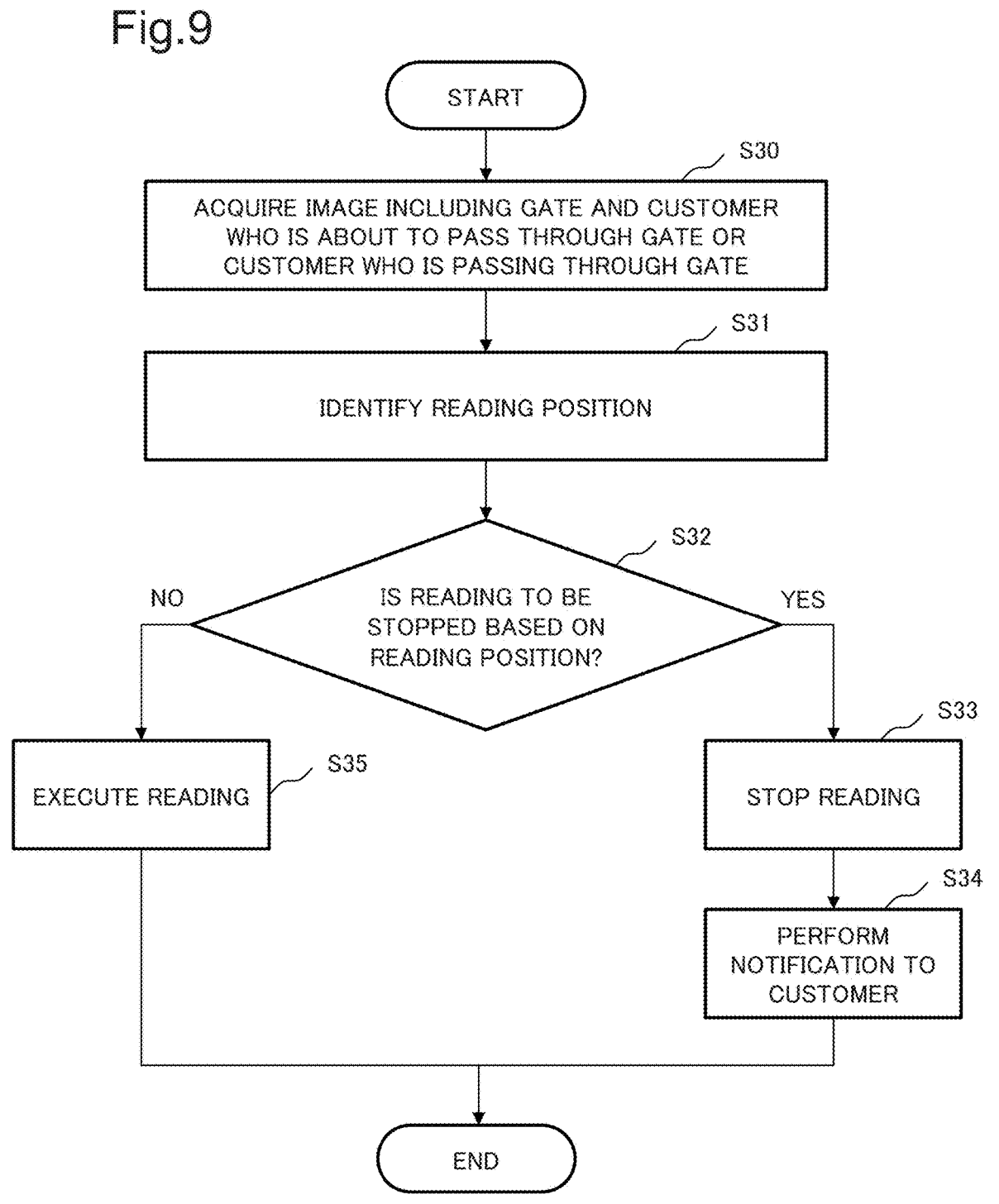

START

S30 ACQUIRE IMAGE INCLUDING GATE AND CUSTOMER WHO IS ABOUT TO PASS THROUGH GATE OR CUSTOMER WHO IS PASSING THROUGH GATE

S31 IDENTIFY READING POSITION

S32 IS READING TO BE STOPPED BASED ON READING POSITION?

YES → S33 STOP READING

S34 PERFORM NOTIFICATION TO CUSTOMER

NO → S35 EXECUTE READING

END

1005
STORAGE DEVICE

1002
MEMORY

1004
INPUT/OUTPUT INTERFACE

1001
PROCESSOR

1003
NETWORK INTERFACE

1006

ARTICLE READING SYSTEM, ARTICLE READING DEVICE, AND ARTICLE READING METHOD

This application is a National Stage Entry of PCT/JP2022/015324 filed on Mar. 29, 2022, the contents of all of which are incorporated herein by reference, in their entirety.

TECHNICAL FIELD

The present disclosure relates to an article reading system, an article reading device, an article reading method, and a recording medium.

BACKGROUND ART

An article reading system is known in which article information can be read when a customer holding an article to which a wireless tag storing the article information is appended passes through a gate.

As a technology relevant to the above-described system, PTL 1 discloses a gate device in which a customer (a payer) having an article associated with a wireless tag such as a radio frequency (RF) tag that stores article information passes through a gate to read the article information and perform payment processing.

PTL 2 discloses a technology of generating time-series information of a position of an article held by a customer with the hand based on an image, and identifying an action performed on the article by the customer based on a movement status of the article indicated by the time-series information of the position.

CITATION LIST

Patent Literature

PTL 1: WO 2021/010163 A1
PTL 2: WO 2021/214986 A1

SUMMARY OF INVENTION

Technical Problem

When the article information is read by the gate device, depending on how the customer holds the article, the wireless tag may pass through a region where the wireless tag is not readable, and reading omission of the article information may occur. On the other hand, it is conceivable to avoid the reading omission by expanding a reading range or enhancing the output of a reading radio wave. However, in this case, a risk of erroneous detection such as reading an article of another customer increases. Therefore, it is required to improve the reading accuracy of the article information in the article reading system.

Therefore, one object of the present disclosure is to provide an article reading system, an article reading device, an article reading method, and a recording medium, which identify a reading position from an image including a gate and a customer, and execute reading of a wireless tag with a reading method based on the identified reading position.

Solution to Problem

One aspect of article reading system of the present disclosure includes an article reading means for reading article information from a wireless tag appended to an article, the article reading means being provided to a gate, and a reading position identifying means for identifying a reading position from an image including the gate and a customer, in which the article reading means executes reading with a reading method based on the identified reading position.

One aspect of an article reading device of the present disclosure includes an article reading means for reading article information from a wireless tag appended to an article, the article reading means being provided to a gate, and a reading position identifying means for identifying a reading position from an image including the gate and a customer, in which the article reading means executes reading with a reading method based on the identified reading position.

One aspect of an article reading method of the present disclosure identifies a reading position from an image including a gate and a customer, and executes reading of article information from a wireless tag appended to an article with a reading method based on the identified reading position.

One aspect of a computer-readable recording medium storing a program of the present disclosure allows a computer to execute identifying a reading position from an image including a gate and a customer, and executing reading of article information from a wireless tag appended to an article with a reading method based on the identified reading position.

Advantageous Effects of Invention

According to the present disclosure, the reading accuracy of the article information in the article reading system can be improved.

BRIEF DESCRIPTION OF DRAWINGS

FIG. 4 is an orthographic view of a gate 210.

FIG. 9 is a flowchart illustrating an example of an operation of the article reading system according to the third example embodiment.

FIG. 10 is a block diagram illustrating a hardware configuration of an information processing device 1000 capable of configuring each constituent in each example embodiment.

EXAMPLE EMBODIMENTS

First Example Embodiment

Figure 1:
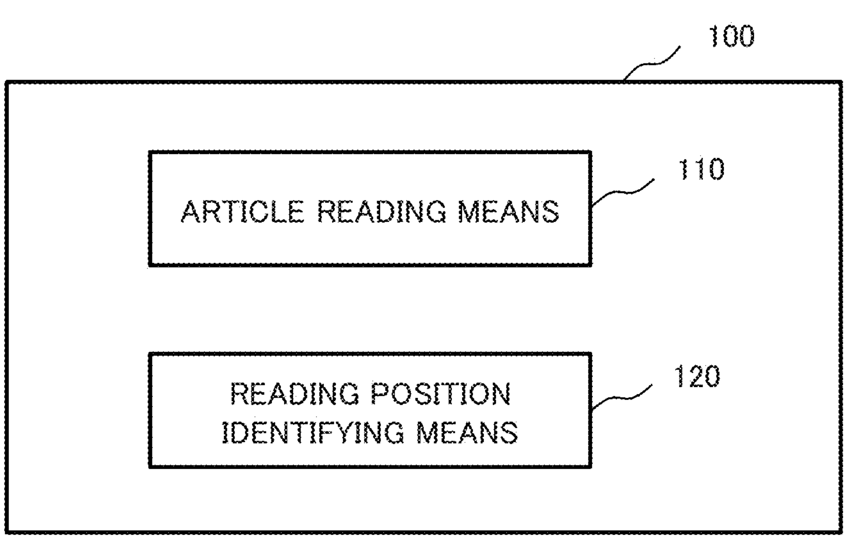
FIG. 1 is a block diagram illustrating an example of a configuration of an article reading system according to a first example embodiment.

FIG. 1 illustrates a configuration example of an article reading system 100 according to a first example embodiment of the present disclosure.

The article reading system 100 includes an article reading means 110 and a reading position identifying means 120. In FIG. 1, each block included in the article reading system 100 indicates a configuration in a functional unit. Therefore, each block included in the article reading system 100 illustrated in FIG. 1 may be implemented in a single device, or may be separately implemented in a plurality of devices.

The article reading means 110 is provided to a gate (not illustrated). The article reading means 110 reads article information from a wireless tag in a reading range. The wireless tag stores the article information. The wireless tag is appended to an article associated to the stored article information.

The article information is information for identifying an article in a store where the article reading system 100 is provided. The article information may include an identification (ID), an article price, and the like allocated to each article.

The reading position identifying means 120 identifies a reading position from an image including the gate and a customer.

In a case where the reading position is identified by the reading position identifying means 120, the article reading means 110 executes reading with a reading method based on the reading position.

Figure 2:
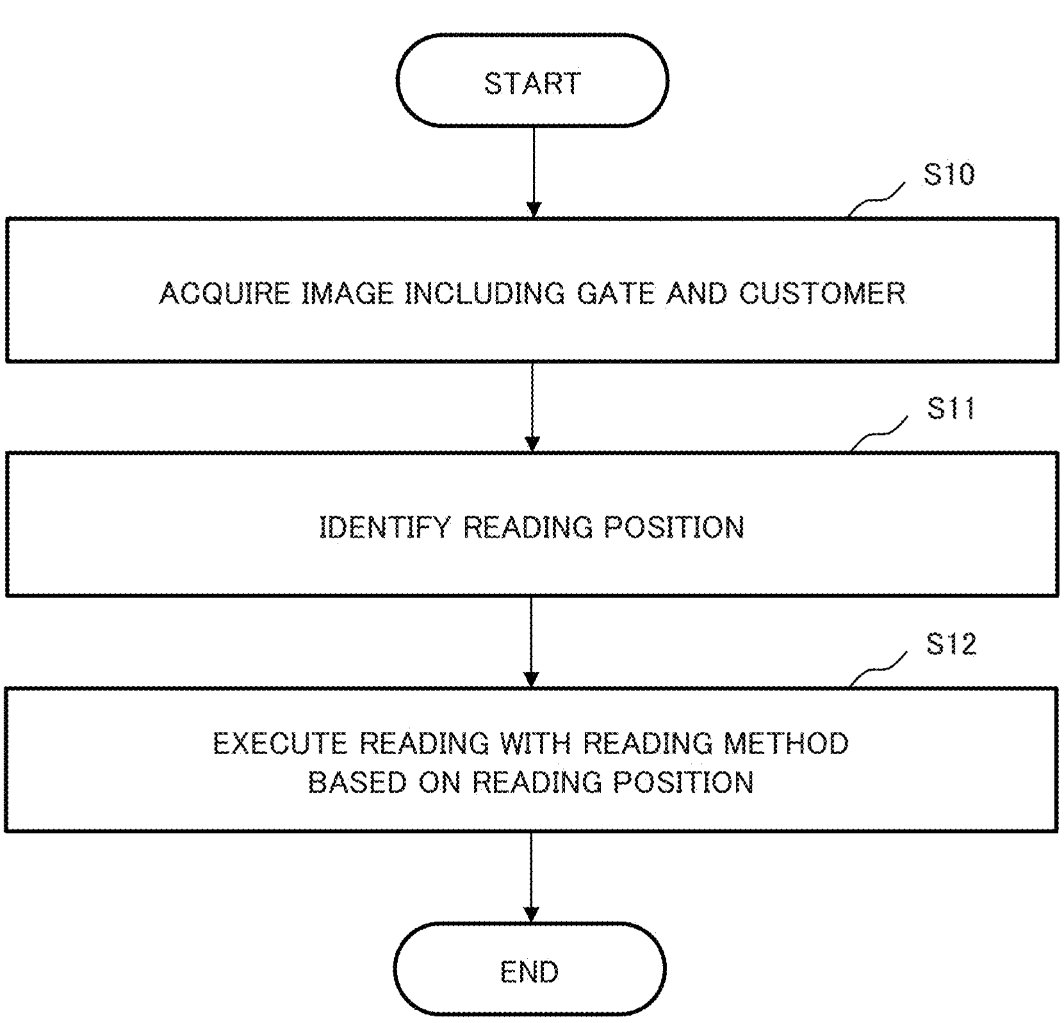
FIG. 2 is a flowchart illustrating an example of an operation of the article reading system according to the first example embodiment.

The operation of the article reading system according to the first example embodiment will be described with reference to the drawings. FIG. 2 is a flowchart illustrating an example of the operation of the article reading system according to the first example embodiment.

The reading position identifying means 120 acquires the image including the gate and the customer (step S10), and identifies the reading position (step S11). The article reading means 110 executes the reading with the reading method based on the reading position identified by the reading position identifying means 120 (step S12).

In the article reading system according to the first example embodiment, the reading of the wireless tag is executed with the reading method based on the reading position identified from the image including the gate and the customer. Accordingly, the reading accuracy of the article information in the article reading system can be improved.

Second Example Embodiment

In a second example embodiment, an article reading system 200 of the present disclosure will be described with reference to the drawings. Hereinafter, the same reference numerals will be applied to the same configurations as those in the first example embodiment, and the repeated description on the same configurations will be omitted.

Figure 3:
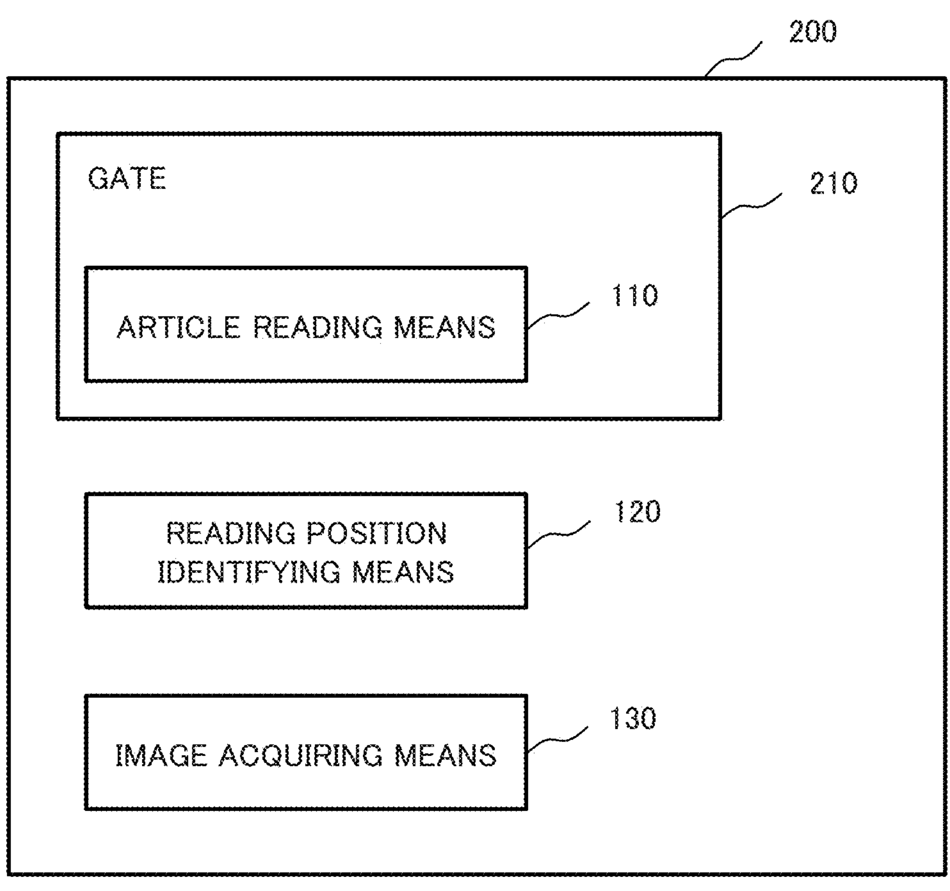
FIG. 3 is a block diagram illustrating an example of a configuration of an article reading system according to a second example embodiment.

FIG. 3 illustrates a configuration example of the article reading system 200 according to the second example embodiment of the present disclosure. The article reading system 200 includes a gate 210, the article reading means 110, the reading position identifying means 120, and an image acquiring means 130. In FIG. 3, each block included in the article reading system 200 indicates a configuration in a functional unit. Therefore, each block included in the article reading system 200 illustrated in FIG. 3 may be implemented in a single device, or may be separately implemented in a plurality of devices. The gate 210 may include at least one of the reading position identifying means 120 and the image acquiring means 130.

The gate 210 includes the article reading means 110. The gate includes a passage through which the customer holding the article passes. The article reading means 110 transmits the reading radio wave for reading the wireless tag and forms the reading range in the gate 210.

Figure 4:
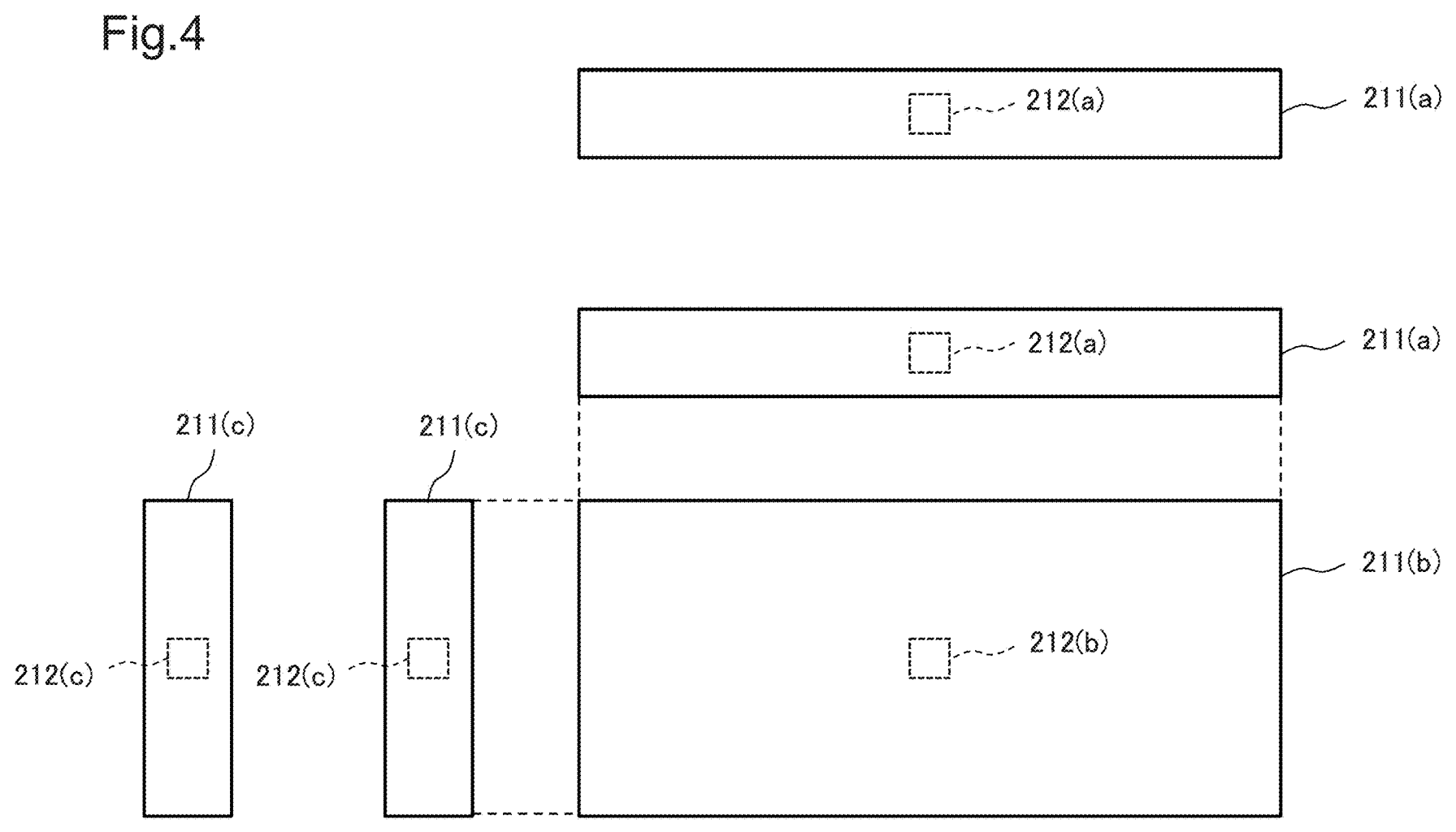

FIG. 4 is an orthographic view of the gate 210. FIG. 4 (*a*) is a top view, FIG. 4 (*b*) is a right side view, and FIG. 4 (*c*) is a front view. The gate 210 in FIG. 4 includes a pair of housings 211. The customer holding the article passes between the pair of housings 211. The gate 210 illustrated in FIG. 4 is an example, and may be a gate in which at least one of an upper portion and a lower portion of the pair of housings 211 illustrated in FIG. 4 is connected.

The housing 211 includes an article reading antenna 212. The article reading antenna 212 is an example of the article reading means 110. In FIG. 4, as an example, each of the pair of housings 211 includes one article reading antenna 212, but the number of article reading antennas 212 is not limited to the above.

Figure 5:
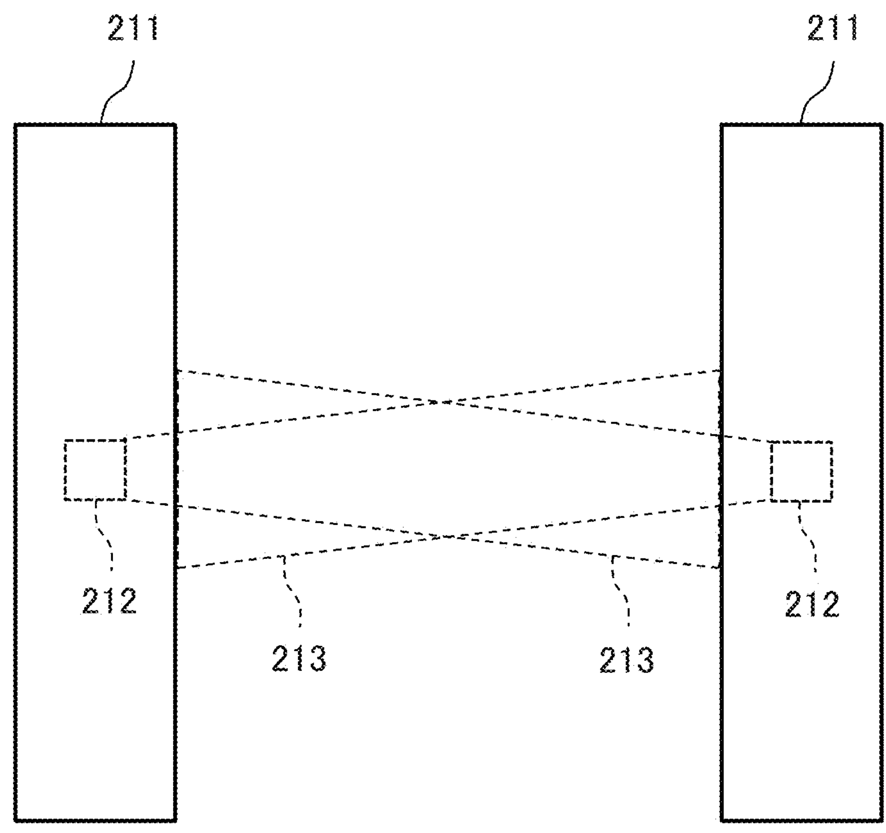
FIG. 5 is a schematic view of a reading range.

The article reading antenna 212 transmits the reading radio wave for reading the wireless tag and forms the reading range in the gate 210. FIG. 5 is a schematic view of the reading range. FIG. 5 is a front view of the gate 210. The article reading antenna 212 provided in each of the pair of housings 211 transmits the reading radio wave toward a region through which the customer passes, and forms a reading range 213. When the wireless tag enters the reading range 213, the reading of the wireless tag is executed. A direction in which the article reading antenna 212 in FIG. 5 transmits the reading radio wave is, for example, a direction in which the reading radio wave is transmitted toward the housing 211 to be paired with the housing 211 including the article reading antenna 212.

The image acquiring means 130 acquires an image including the gate 210 and the customer who is about to pass through the gate 210. Here, the image acquired by the image acquiring means 130 may be an image including the gate 210 and the customer who is passing through the gate 210. The image acquiring means 130 may be provided externally to the gate 210 as an external device, or may be provided in the gate 210. The image acquiring means may be an in-store camera photographing the inside of the store. The in-store camera may be a security camera attached to a ceiling or a wall surface in the store.

The determination of the customer who is about to pass through the gate 210 may be performed by the image acquiring means 130 or may be performed by a determining means (not illustrated). As an example of the determination, it is conceivable to determine a customer whose distance to the gate 210 is within a predetermined range as the customer who is about to pass through the gate 210. A customer whose traveling direction is facing the gate 210 may be determined as the customer who is about to pass through the gate 210. As another example, a customer whose line of sight is directed toward the gate 210 may be determined as the customer who is about to pass through the gate 210. The determination criterion described here is an example, and the determination criterion is not limited to the above. The determination may be performed by combining the examples of the determination described here.

The reading position identifying means 120 identifies the reading position from the image acquired by the image acquiring means 130. For example, the reading position identifying means 120 recognizes the article held by the customer included in the image, and identifies the position of the article as the reading position. An object held by the customer included in the image may be recognized, and the position of the article may be identified as the reading position. The object held by the customer is, for example, a bag or a shopping basket in which the customer can store the article.

As another example of identifying the reading position by the reading position identifying means 120, the reading position may be identified from the skeleton of the customer included in the image. In a case where the customer holds the article, the article is likely to be held with the hand or held with the arm. Therefore, the skeleton of the customer may be recognized from the image acquired by the image acquiring means 130, and the position of the hand or the arm of the customer may be identified as the reading position.

As another example of identifying the reading position by the reading position identifying means 120, the reading position may be identified from the height of the customer included in the image. A position where the customer holds the article varies depending on the height of the customer. Therefore, the height of the customer may be recognized from the image acquired by the image acquiring means 130, and the reading position may be identified in accordance with the height of the customer.

The reading position identifying means 120 may identify the reading position by combining the image acquired by the image acquiring means 130 and other information. An example of the information to be combined includes the received signal intensity of the wireless tag. By combining the image and the received signal intensity, the position of the wireless tag to be read can be recognized with a higher accuracy, and a more appropriate reading position can be identified. The information to be combined with the image is not limited to the received signal intensity, and may be information for identifying the reading position.

In a case where the reading position is identified by the reading position identifying means 120, the article reading means 110 executes the reading with a reading method based on the identified reading position.

As an example of the reading method based on the reading position, for example, in a case where the reading position is out of the reading range 213, illustrated in FIG. 5, in a height direction, the article reading means 110 changes the reading range in the height direction so as to include the reading position. Here, the height direction may be represented by coordinates in a direction vertical to the floor, or may be represented by coordinates in a vertical direction.

Figure 6A:
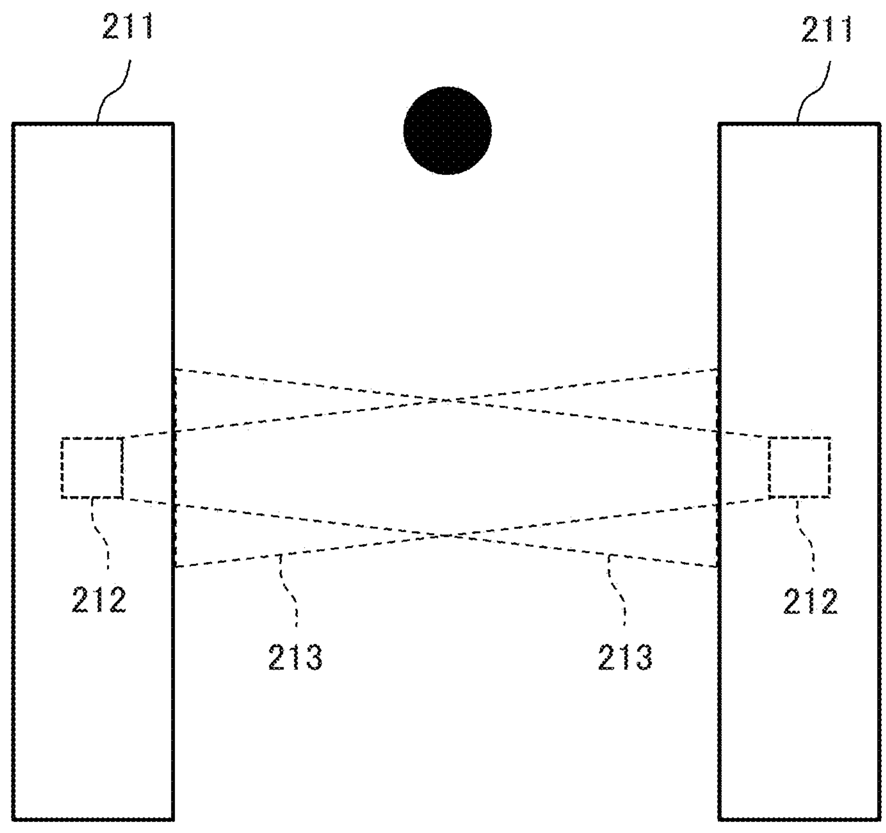
FIG. 6A is a schematic view illustrating the reading range and an identified reading position.
Figure 6B:
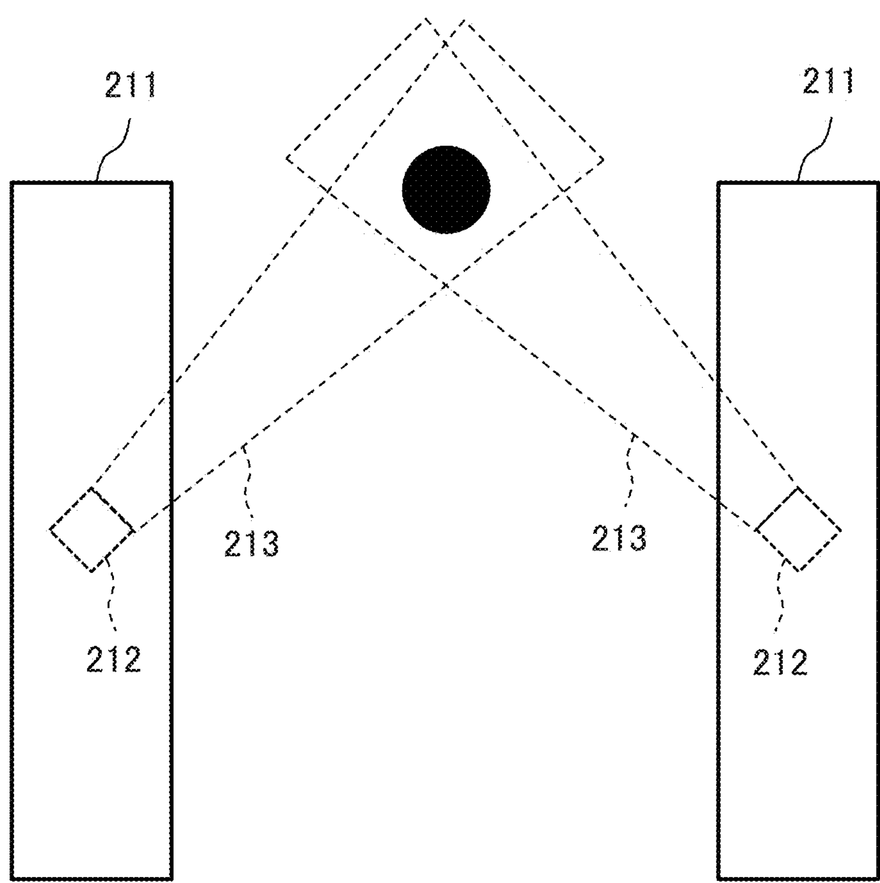
FIG. 6B is a schematic view illustrating a state in which a direction of an article reading antenna 212 is changed such that the reading range includes the reading position.

A change in the reading range in a case where the reading position is outside the reading range 213 illustrated in FIG. 5 will be described with reference to FIGS. 6A to 6E. In FIG. 6A, the height of the reading position identified by the reading position identifying means 120 is indicated by a black circle. In FIG. 6A, since the height of the reading position is outside the reading range 213, the article reading means 110 changes the reading range such that the reading range includes the height of the reading position. As an example of the change in the reading range, the direction in which the article reading antenna 212 transmits the reading radio wave is changed. FIG. 6B is a schematic view of the reading range when the direction in which the article reading antenna 212 transmits the reading radio wave is changed. In FIG. 6A, since the height of the reading position is above the reading range 213, in FIG. 6B, the reading range 213 includes the height of the reading position by directing the article reading antenna 212 upward.

As described above, in a case where the height of the reading position is outside the reading range, the reading accuracy of the article information in the article reading system can be improved by changing the direction of the article reading means to change the reading range.

Figure 6C:
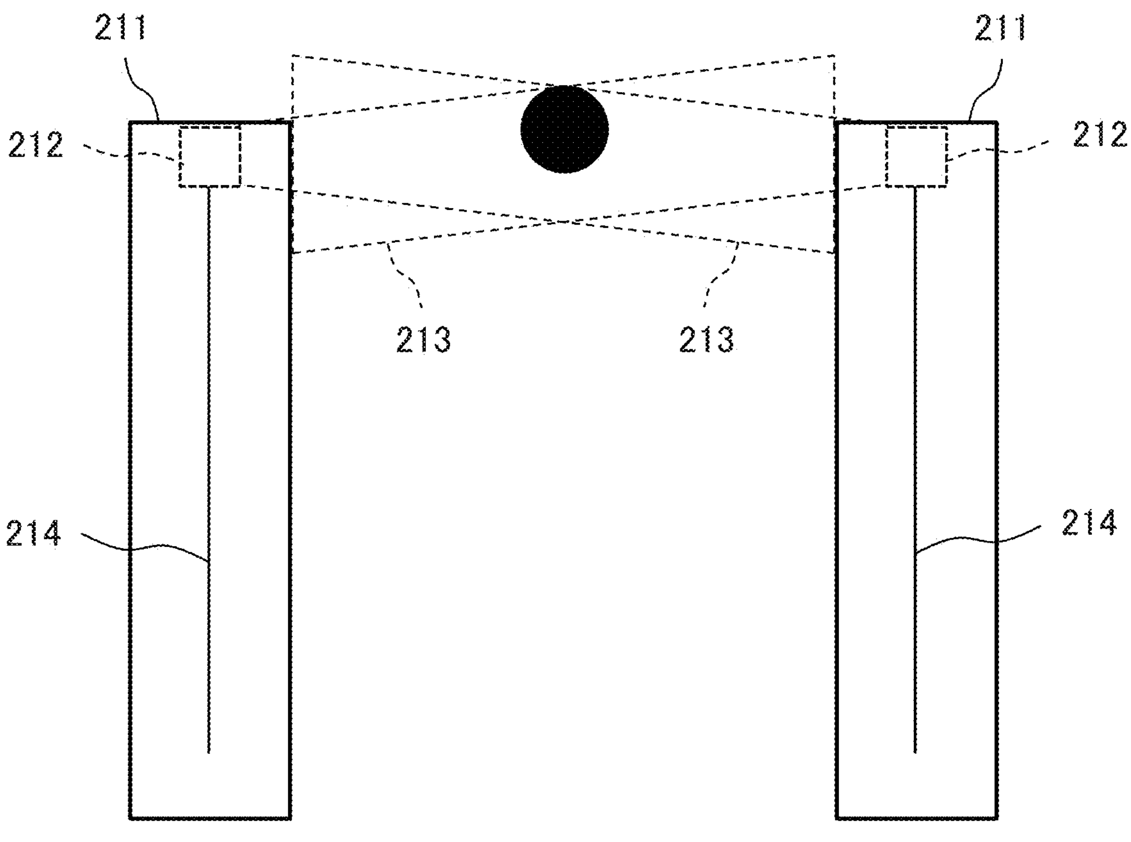
FIG. 6C is a schematic view illustrating a state in which a position of the article reading antenna 212 is changed such that the reading range includes the reading position.

Furthermore, in a case where the article reading antenna 212 is designed to be movable in the housing 211, it is conceivable to change the position of the article reading antenna 212 in the housing 211, as another example of the change in the reading range. FIG. 6C is a schematic view of the reading range when the position of the article reading antenna 212 in the housing 211 is changed. In FIG. 6C, the article reading antenna 212 is moved along a rail 214 such that the reading range 213 includes the height of the reading position.

As described above, in a case where the height of the reading position is outside the reading range, the reading accuracy of the article information in the article reading system can be improved by changing the position of the article reading means to change the reading range.

Figure 6D:
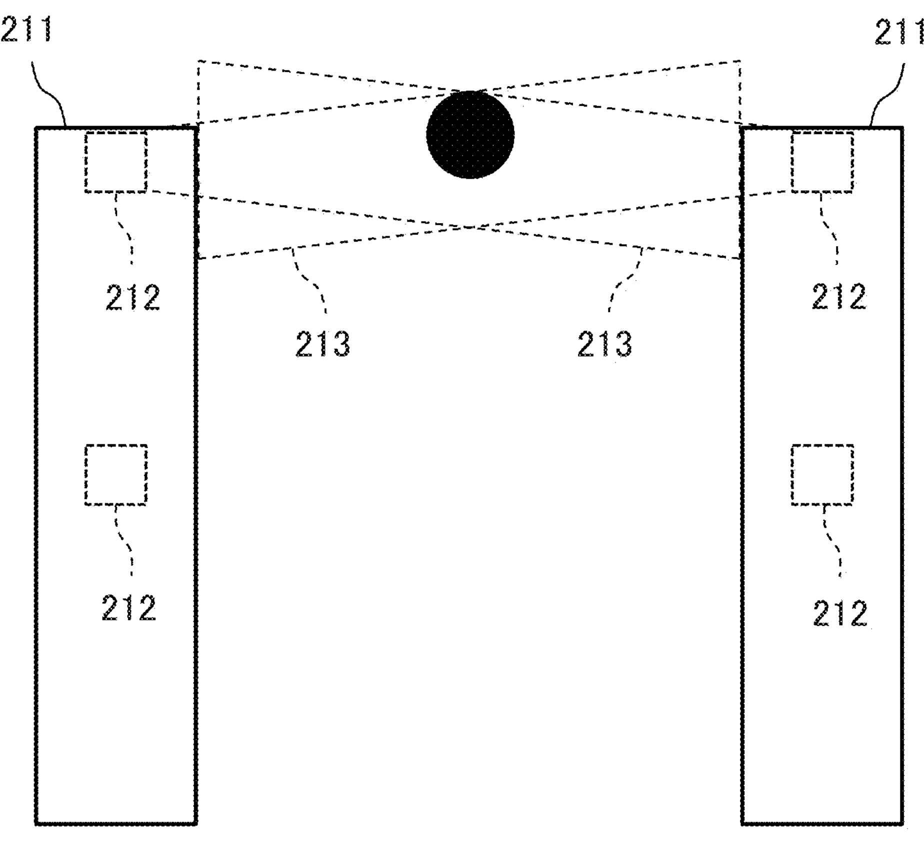
FIG. 6D is a schematic view illustrating a state in which the article reading antenna 212 transmitting a reading radio wave is changed such that the reading range includes the reading position.

In a case where a plurality of article reading antennas 212 are provided, it is conceivable to switch the article reading antenna 212 transmitting the reading radio wave, as another example of the change in the reading range. FIG. 6D is a schematic view when the housing 211 includes the plurality of article reading antennas 212 and the reading range is changed by switching the article reading antenna 212 transmitting the reading radio waves. In FIG. 6D, the article reading antenna 212 provided above the article reading antenna 212 transmitting the reading radio wave in FIG. 6A transmits the reading radio wave such that the reading range 213 includes the height of the reading position.

As described above, in a case where the height of the reading position is outside the reading range, the reading accuracy of the article information in the article reading system can be improved by switching the article reading means transmitting the reading radio wave to change the reading range.

Figure 6E:
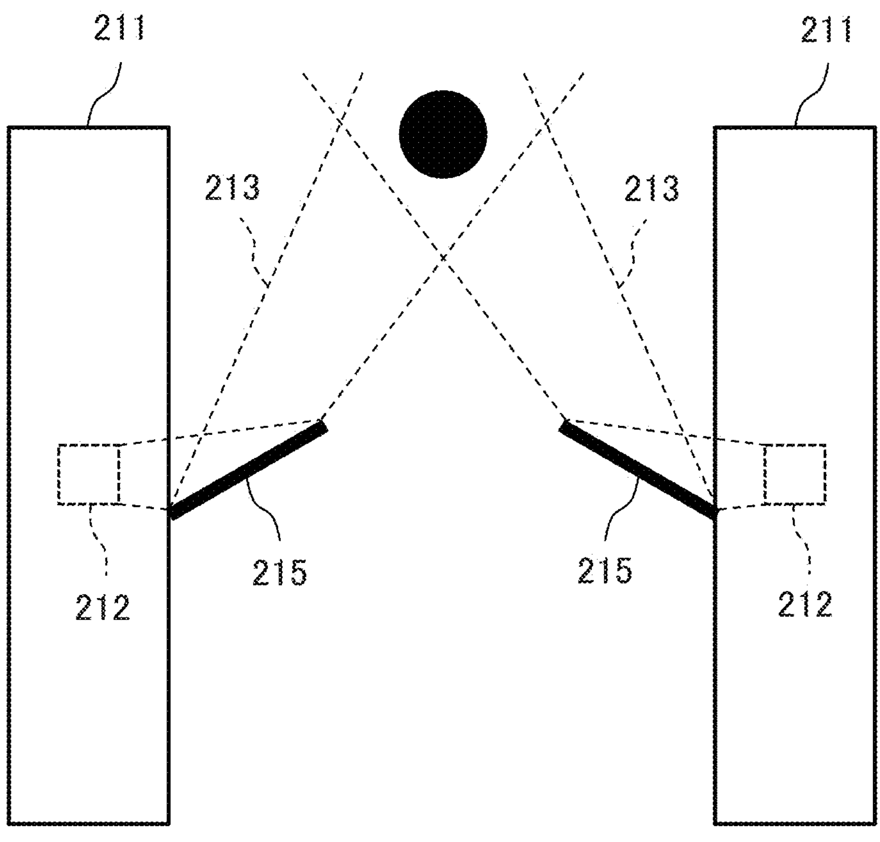
FIG. 6E is a schematic view illustrating a state in which the reading range is changed by a radio wave reflecting means 215 such that the reading range includes the reading position.

In a case where a radio wave reflecting means is provided, it is conceivable to change the angle of the radio wave reflecting means, as another example of the change in the reading range. FIG. 6E is a schematic view when the housing 211 includes the radio wave reflecting means and the reading range is changed by reflecting the reading radio wave with the radio wave reflecting means. In FIG. 6E, the reading range 213 includes the height of the reading position by changing the angle of the radio wave reflecting means 215.

As described above, in a case where the height of the reading position is outside the reading range, the reading accuracy of the article information in the article reading system can be improved by changing the reading range with the radio wave reflecting means.

In a case where the height of the reading position is outside the reading range and there is no person other than the customer around the customer who is about to pass through the gate 210, the article reading antenna 212 may enhance the output intensity of the reading radio wave to be transmitted. In this case, the reading range can be expanded by enhancing the output intensity such that the reading range may include the reading position.

As described above, in a case where the height of the reading position is outside the reading range, the output intensity of the reading radio wave is enhanced such that the reading range can be expanded, and the reading accuracy of the article information in the article reading system can be improved. The output intensity of the reading radio wave is enhanced when there is no person other than the customer around the customer who is about to pass through the gate, and thus, a risk of erroneous detection is not increased.

As an example of the reading method based on the reading position, a case where the height of the reading position is outside the reading range has been described, but the same applies to a case where the reading position in the horizontal direction is outside the reading range in addition to the height direction. That is, when the customer passes through the gate 210, the reading range is changed in a case where the reading position is expected to pass through the outside of the reading range or the reading position is passing through the outside of the reading range.

Figure 7:
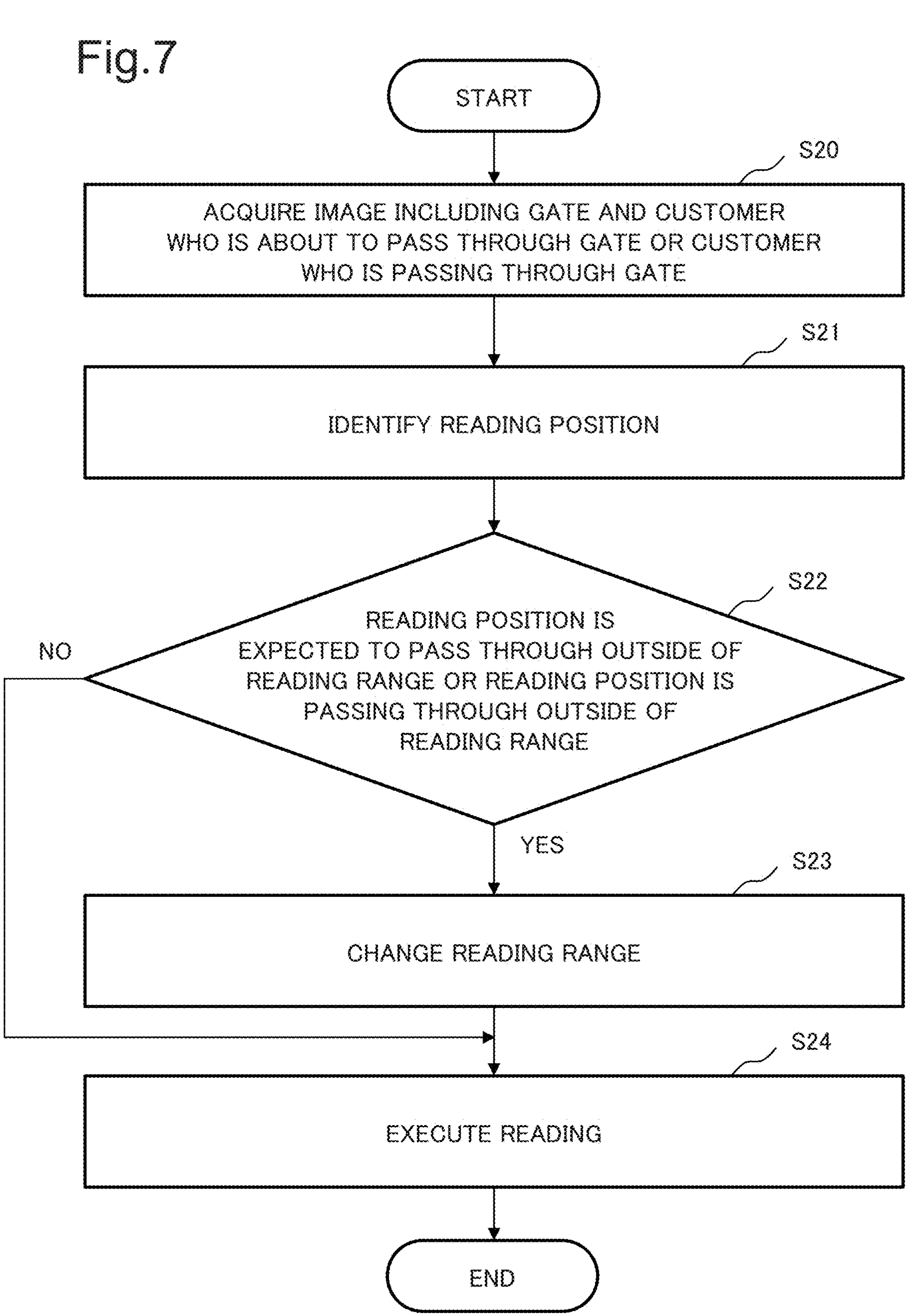
FIG. 7 is a flowchart illustrating an example of an operation of the article reading system according to the second example embodiment.

The operation of the article reading system 200 according to the second example embodiment will be described with reference to the drawings. FIG. 7 is a flowchart illustrating an example of the operation of the article reading system 200 according to the second example embodiment.

First, the image acquiring means 130 acquires the image including the gate 210 and the customer who is about to pass through the gate 210 or the customer who is passing through the gate 210 (step S20). The reading position identifying means 120 identifies the reading position from the image acquired by the image acquiring means 130 (step S21).

In a case where the identified reading position is expected to pass through the outside of the reading range or the reading position is passing through the outside of the reading range (YES in step S22), the article reading means 110 changes the reading range (step S23) and executes the reading (step S24). On the other hand, in a case where the identified reading position is expected to pass through the inside of the reading range or the reading position is passing through the inside of the reading range (NO in step S22), the process proceeds to step S24.

In the article reading system according to the second example embodiment, the reading of the wireless tag is executed with the reading method based on the reading position identified from the image including the gate 210 and the customer who is about to pass through the gate or the customer who is passing through the gate. Accordingly, the reading accuracy of the article information in the article reading system can be improved.

As an example of the reading method based on the reading position, the reading range is changed by changing the direction of the article reading means. Accordingly, the reading accuracy of the article information in the article reading system can be improved.

As an example of the reading method based on the reading position, the reading range is changed by changing the position of the article reading means. Accordingly, the reading accuracy of the article information in the article reading system can be improved.

As an example of the reading method based on the reading position, the reading range is changed by switching the article reading means transmitting the reading radio wave. Accordingly, the reading accuracy of the article information in the article reading system can be improved.

As an example of the reading method based on the reading position, the reading range is changed by the radio wave reflecting means. Accordingly, the reading accuracy of the article information in the article reading system can be improved.

As an example of the reading method based on the reading position, the reading range can be expanded by enhancing the output intensity of the reading radio wave. Accordingly, the reading accuracy of the article information in the article reading system can be improved. The output intensity of the reading radio wave is enhanced when there is no person other than the customer around the customer who is about to pass through the gate, and thus, a risk of erroneous detection is not increased.

Third Example Embodiment

An article reading system 300 according to a third example embodiment is different from the article reading system 200 according to the second example embodiment in that a notifying means 310 is provided. Hereinafter, the same reference numerals will be applied to the same configurations as those in the second example embodiment, and the description on the same configurations will be omitted.

Figure 8:
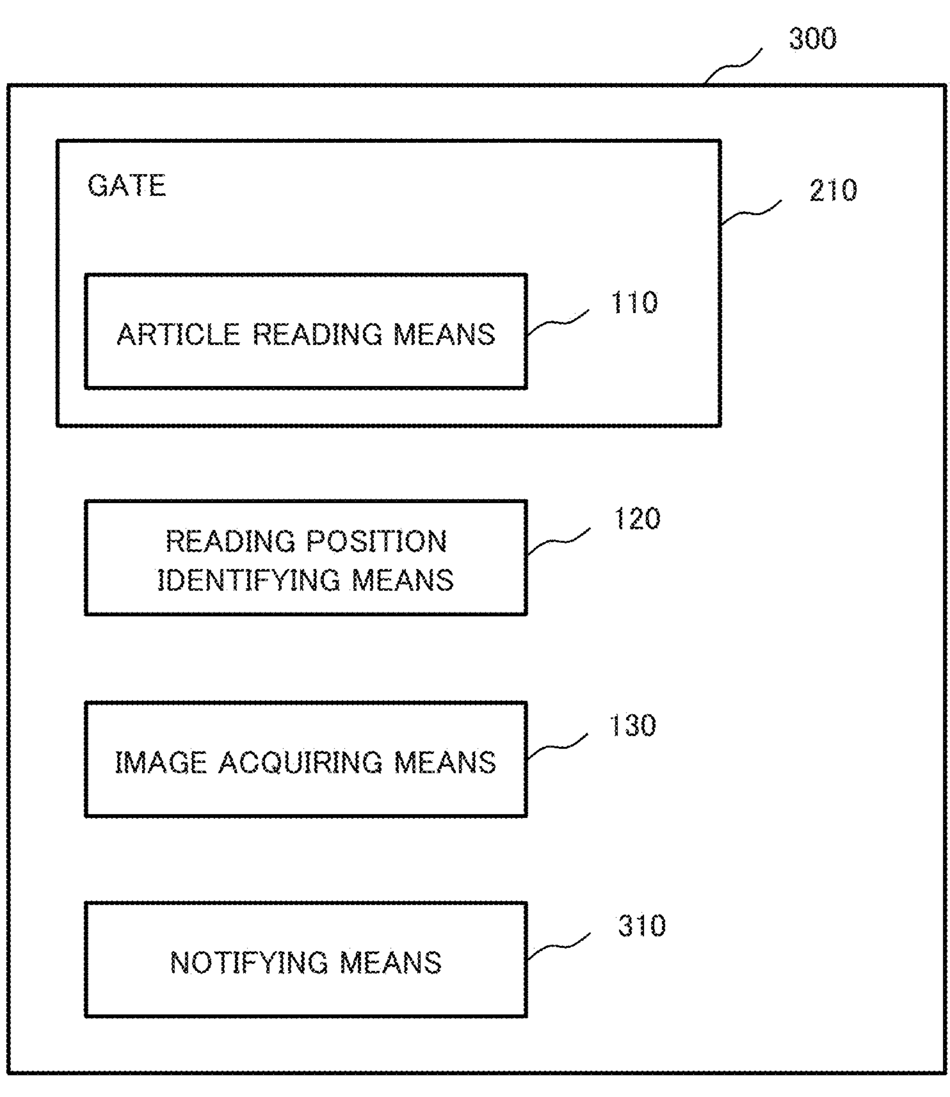
FIG. 8 is a block diagram illustrating an example of a configuration of an article reading system according to a third example embodiment.

FIG. 8 illustrates a configuration example of the article reading system 300 according to the third example embodiment of the present disclosure. The article reading system 300 includes the gate 210, the article reading means 110, the reading position identifying means 120, the image acquiring means 130, and the notifying means 310. In FIG. 8, each block included in the article reading system 300 indicates a configuration in a functional unit. Therefore, each block included in the article reading system 300 illustrated in FIG. 8 may be implemented in a single device, or may be separately implemented in a plurality of devices. The gate 210 may include at least one of the reading position identifying means 120, the image acquiring means 130, and the notifying means 310.

In the article reading system 300 according to the third example embodiment, the article reading means 110 does not execute reading in a case where a predetermined condition is not satisfied.

As an example of the predetermined condition, when the customer passes through the gate 210, it is expected that the reading position identified by the reading position identifying means 120 passes through the inside of the reading range, or the reading position identified by the reading position identifying means 120 is passing through the inside of the reading range.

As another example of the predetermined condition, it is determined that the wireless tag can be read by changing the reading range with the method described in the second example embodiment.

In a case where the article reading means 110 stops executing the reading, the notifying means 310 performs a notification to the customer. The notification may be notification by a voice or notification by the display of a moving image or a still image. The notification may be performed by turning on or blinking a light emitting unit. Such notification methods may be combined.

The contents to be notified include, but are not limited to, contents to guide the customer to a manned register or a nearby clerk, contents to prompt to change a position of holding the article, contents to prompt to pass through the gate 210, and the like. The notifying means may perform the notification to the clerk, or may perform the notification to both the customer and the clerk.

The notification contents to the customer may be changed based on the reading position. As the notification contents based on the reading position, for example, in a case where the reading position is high, it is conceivable to perform the notification for prompting a decrease in the position of the article. On the other hand, in a case where the reading position is low, it is conceivable to perform the notification for prompting an increase in the position of the article. In a case where the reading position is not capable of being identified, it is conceivable to perform the notification for waiting until the clerk comes to take an action. In a case where the reading position is not capable of being identified, both the notification to the customer and the notification to the clerk may be performed.

The operation of the article reading system 300 according to the third example embodiment will be described with reference to the drawings. FIG. 9 is a flowchart illustrating an example of the operation of the article reading system 300 according to the third example embodiment.

First, the image acquiring means 130 acquires the image including the gate 210 and the customer who is about to pass through the gate 210 or the customer who is passing through the gate 210 (step S30). The reading position identifying means 120 identifies the reading position from the image acquired by the image acquiring means 130 (step S31).

In a case where the reading is to be stopped based on the identified reading position (YES in step S32), the article reading means 110 stops executing the reading (step S33), and the notifying means 310 performs the notification to the customer (step S34). On the other hand, in a case where the reading is not to be stopped (NO in step S32), the article reading means 110 executes the reading (step S35).

In the article reading system according to the third example embodiment, the execution of the reading of the wireless tag is to be stopped based on the reading position identified from the image including the gate and the customer who is about to pass through the gate or the customer who is passing through the gate, and the notification to the customer is performed. As a result, it is possible to prompt the customer to take an appropriate action, and thus, it is possible to improve the reading accuracy of the article information in the article reading system.

Modification Example 1

As a modification example of the article reading system disclosed in the first to third example embodiments, the article reading system may further include a paying means. The paying means performs a payment for purchasing the article based on the information of the wireless tag read by the article reading means 110. The payment may be performed in cash, or may be an electronic payment such as a credit card or a code payment.

The article reading system may include a customer differentiating means. The customer differentiating means differentiates the customer passing through the gate 210. As an example of the differentiation by the customer differentiating means, biometric authentication such as face authentication or fingerprint authentication may be performed, or authentication may be performed by acquiring differentiation information capable of differentiating the customer. In a case where the authentication of the customer is performed by the face authentication, the image acquired by the image acquiring means 130 may be used.

As an example of acquiring the differentiation information capable of differentiating the customer, the reading of a membership card, the reading of a code displayed on a mobile terminal held by the customer, the input of a membership number, and the like are conceivable but are not limited to the above.

In a case where the customer differentiating means is provided, the customer differentiated by the customer differentiating means and the article information read from the wireless tag by the article reading means 110 may be stored in association with each other. The differentiation information acquired by the customer differentiating means and the article information read from the wireless tag by the article reading means 110 may be stored in association with each other.

In a case where the article reading system includes both the paying means and the customer differentiating means, the paying means may perform the payment by using a payment method associated with the customer differentiated by the customer differentiating means. In this case, the customer can complete the payment only by passing through the gate 210, which is convenient. Since the reading accuracy of the article information can be improved by the article reading system disclosed in the first to third example embodiments, it is also possible to reduce time and effort to check the purchased article by the clerk after the payment by the paying means.

The customer and the article information may be associated at the gate 210, and the payment may be performed by the paying means provided separately from the gate 210. In this case, the paying means may also include a customer differentiating means. For example, when the customer passes through the gate 210, the customer and the article information are associated with each other. The customer is differentiated by the customer differentiating means included in the paying means, and the payment is performed using the article information associated with the differentiated customer. Even in such a case, since the reading accuracy of the article information can be improved by applying the article reading system of the present disclosure, a risk of payment omission due to reading omission can be reduced.

Modification Example 2

As a modification example of the article reading system disclosed in the first to third example embodiments, the article reading system may further include an article information acquiring means. The article information acquiring means acquires information on the article held by the customer. As an example of information acquisition by the article information acquiring means, the customer may be differentiated by the biometric authentication or the reading of customer differentiation information, and the article information associated with the differentiated customer may be acquired. The article information acquiring means may acquire the article information by reading a code indicating the article information.

The information acquired by the article information acquiring means is, for example, information on the article for which the payment has been completed by the customer. In this case, it is possible to determine whether the article information read from the wireless tag by the article reading means 110 is coincident with the article information acquired by the article information acquiring means.

For example, the customer completes the payment before passing through the gate 210, and passes through the gate 210 when leaving the store. As described above, when the customer leaves the store, it is possible to determine whether the article for which the payment has been completed is coincident with the article to be taken out to the outside of the store, and it is possible to detect unauthorized removal of the article. Since the reading accuracy of the article information can be improved by the article reading system disclosed in the first to third example embodiments, the detection accuracy of the unauthorized removal can also be improved.

Figure 10:
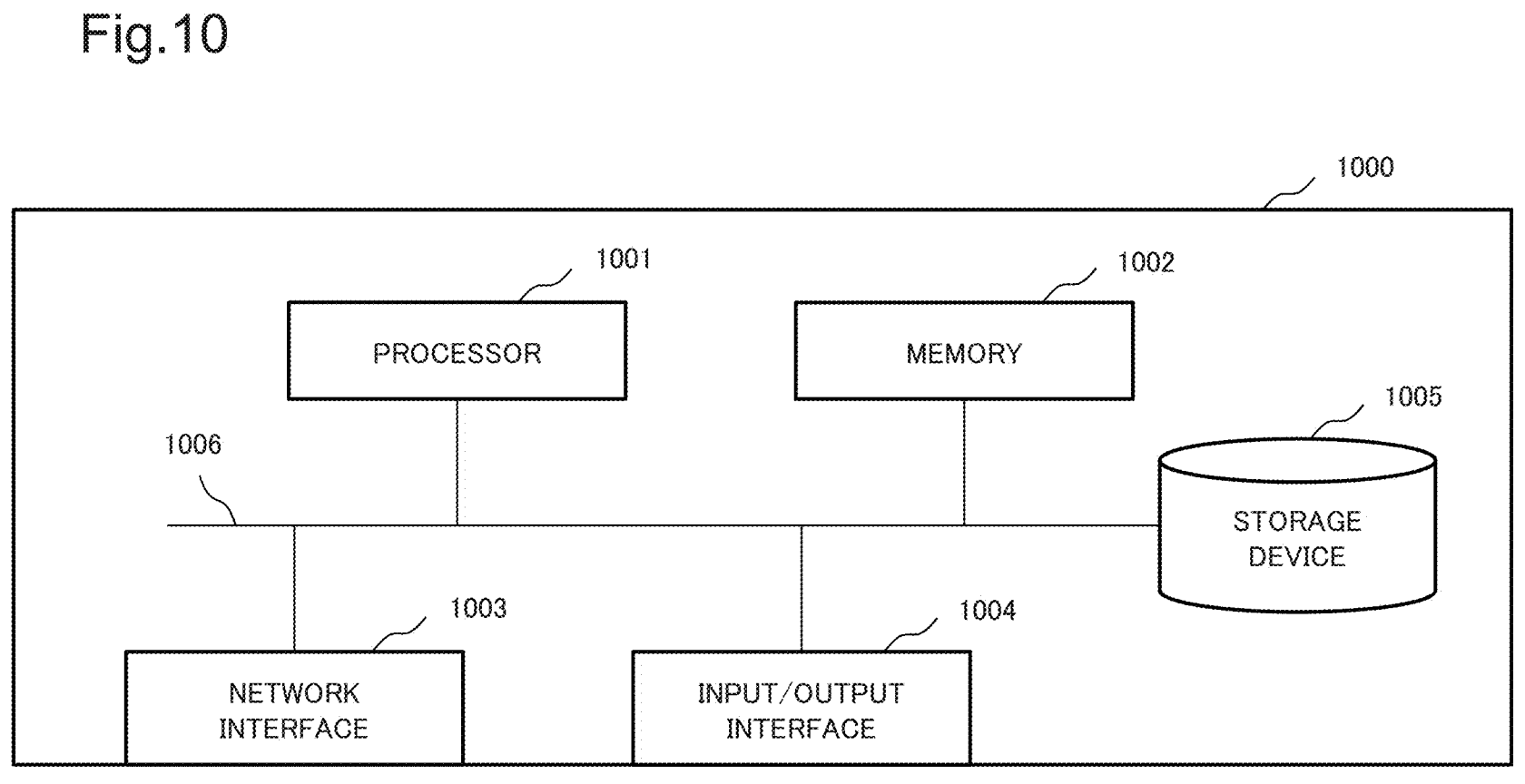

In each example embodiment of the present disclosure, each constituent of each article reading system indicates a block in a functional unit. Some or all of the constituents in each article reading system are enabled by a combination of hardware and a program. FIG. 10 is a block diagram illustrating a hardware configuration of an information processing device 1000 capable of configuring each constituent in each example embodiment.

The information processing device 1000 includes a processor 1001, a memory 1002, a network interface 1003, an input/output interface 1004, and a storage device 1005, and the constituents of the information processing device 1000 are connected to each other by a bus 1006 such that communication is available.

The processor 1001 is enabled by a central processing unit (CPU), a graphics processing unit (GPU), or the like. The memory 1002 is a main storage device enabled by a random access memory (RAM) or the like.

The network interface 1003 is an interface for connecting to a network. Here, the network is a local area network (LAN) or a wide area network (WAN).

The input/output interface 1004 is an interface for connecting to various input/output devices.

The storage device 1005 is an auxiliary storage device enabled by a hard disk drive (HDD), a solid state drive (SSD), a memory card, a read only memory (ROM), or the like. The storage device 1005 may store a program for enabling the function of each constituent.

The processor 1001 enables the function of each constituent by reading a program stored in the storage device 1005 into the memory 1002 and executing the program. The program may be supplied from a network via the network interface 1003. The program is stored in advance in a recording medium (not illustrated), and may be supplied by reading the program.

According to this program, it is possible to display a processing result including the intermediate state for each stage via a display device as necessary, or communicate with the outside via the network interface 1003. This program can be recorded in a computer-readable (non-transitory) recording medium.

The present disclosure is not limited to each example embodiment described above, and various modifications are available, and example embodiments obtained by appropriately combining configurations, operations, and processes disclosed in different example embodiments and modification examples are also included in the technical scope of the present disclosure.

While the invention has been particularly shown and described with reference to exemplary embodiments thereof, the invention is not limited to these embodiments. It will be understood by those of ordinary skill in the art that various changes in form and details may be made therein without departing from the spirit and scope of the present disclosure as defined by the claims.

Supplementary Note 1

An article reading system, including:

an article reading means for reading article information from a wireless tag appended to an article, the article reading means being provided to a gate; and a reading position identifying means for identifying a reading position from an image including the gate and a customer, in which the article reading means executes reading with a reading method based on the identified reading position.

Supplementary Note 2

The article reading system according to Supplementary Note 1, in which the reading position identifying means identifies the reading position from an object held by the customer.

Supplementary Note 3

The article reading system according to Supplementary Note 1, in which the reading position identifying means identifies the reading position from a skeleton of the customer.

Supplementary Note 4

The article reading system according to Supplementary Note 1, in which the reading position identifying means identifies the reading position from a height of the customer.

Supplementary Note 5

The article reading system according to any one of Supplementary Notes 1 to 4, in which the article reading means executes reading by changing a reading range based on the reading position.

Supplementary Note 6

The article reading system according to any one of Supplementary Notes 1 to 5, in which, when there is no person other than the customer around the customer, the article reading means executes reading by enhancing output intensity of a reading radio wave for reading the wireless tag based on the reading position.

Supplementary Note 7

The article reading system according to any one of Supplementary Notes 1 to 6, further including a notifying means, in which the article reading means executes reading of the wireless tag when a predetermined condition is satisfied, and does not execute reading of the wireless tag when the predetermined condition is not satisfied, and the notifying means performs a notification to the customer when the article reading means does not execute the reading of the wireless tag.

Supplementary Note 8

The article reading system according to any one of Supplementary Notes 1 to 7, further including a paying means, in which the paying means performs a payment based on the article information read by the article reading means.

Supplementary Note 9

The article reading system according to any one of Supplementary Notes 1 to 8, further including a customer differentiating means, in which the customer differentiating means differentiates a customer passing through the gate.

Supplementary Note 10

The article reading system according to any one of Supplementary Notes 1 to 9, further including an article information acquiring means, in which the article information acquiring means acquires information on the article held by the customer.

Supplementary Note 11

An article reading device, including:

an article reading means for reading article information from a wireless tag appended to an article, the article reading means being provided to a gate; and a reading position identifying means for identifying a reading position from an image including the gate and a customer, in which the article reading means executes reading with a reading method based on the identified reading position.

Supplementary Note 12

An article reading method, including:

identifying a reading position from an image including a gate and a customer; and executing reading of article information from a wireless tag appended to an article with a reading method based on the identified reading position.

Supplementary Note 13

A computer-readable recording medium storing a program for allowing a computer to execute:

identifying a reading position from an image including a gate and a customer; and executing reading of article information from a wireless tag appended to an article with a reading method based on the identified reading position.

Reference Signs List

100 article reading system
110 article reading means
120 reading position identifying means
200 article reading system
210 gate
211 housing
212 article reading antenna
213 reading range
214 rail
215 radio wave reflecting means
220 information transmitting means
300 article reading system
310 notifying means
1000 information processing device
1001 processor
1002 memory
1003 network interface
1004 input/output interface
1005 storage device
1006 bus

What is claimed is:

1. An article reading system, comprising:
at least one memory configured to store instructions: and
at least one processor configured to execute the instructions to:
identify a reading position from an image including a gate and a customer;
execute reading of article information from a wireless tag appended to an article with a reading method based on the identified reading position, using an article reader provided to the gate; and
when there is no person other than the customer around the customer,
execute the reading by enhancing output intensity of a reading radio wave for reading the wireless tag based on the reading position.

2. The article reading system according to claim 1,
wherein the at least one processor is further configured to execute the instructions to:
identify the reading position from an object held by the customer.

3. The article reading system according to claim 1,
wherein the at least one processor is further configured to execute the instructions to:
identify the reading position from a skeleton of the customer.

4. The article reading system according to claim 1,
wherein the at least one processor is further configured to execute the instructions to:
identify the reading position from a height of the customer.

5. The article reading system according to claim 1,
wherein the at least one processor is further configured to execute the instructions to:
execute reading by changing a reading range based on the reading position.

6. The article reading system according to claim 1,
wherein the at least one processor is further configured to:
execute reading of the wireless tag when a predetermined condition is satisfied;
not to execute reading of the wireless tag when the predetermined condition is not satisfied; and
perform a notification to the customer when the reading of the wireless tag is not executed.

7. An article reading device, comprising:
at least one memory configured to store instructions to:
at least one processor configured to execute the instructions to:
identify a reading position from an image including a gate and a customer;
execute reading of article information from a wireless tag appended to an article with a reading method based on the identified reading position, using an article reader provided to the gate; and when there is no person other than the customer around the customer, execute the reading by enhancing output intensity of a reading radio wave for reading the wireless tag based on the reading position.

8. An article reading method, comprising:

identifying a reading position from an image including a gate and a customer;

executing reading of article information from a wireless tag appended to an article with a reading method based on the identified reading position; and when there is no person other than the customer around the customer, execute the reading by enhancing output intensity of a reading radio wave for reading the wireless tag based on the reading position.

* * * * *